P. J. HARDY.
Bearings for Shafting.

No. 145,565. Patented Dec. 16, 1873.

Witnesses,
Chas H. Smith
Harold Serrell

Inventor.
Pierre J. Hardy
per L. W. Serrell
Atty

UNITED STATES PATENT OFFICE.

PIERRE J. HARDY, OF NEW YORK, N. Y.

IMPROVEMENT IN BEARINGS FOR SHAFTING.

Specification forming part of Letters Patent No. 145,565, dated December 16, 1873; application filed November 14, 1873.

*To all whom it may concern:*

Be it known that I, PIERRE J. HARDY, of the city and State of New York, have invented an Improvement in Bearings for Shafting, of which the following is a specification:

Boxes or bearings for shafting have been made of two parts united together by bolts, and the said boxes have been hollow for receiving babbitt-metal or other material. In many instances rings are secured to the shaft at each side of the boxes, so as to prevent end motion in the shaft. In use it is found that the collar or ring is liable to unequal wear and to noise, in consequence of coming into contact with the ends of the two parts of the bearing.

My invention is made for avoiding these difficulties; and consists in a two-part bearing or box, made with complete rings at the ends of one part of the box, and between which rings the other part of the box is placed and attached by bolts. In this bearing the complete rings at the ends of one part of the box, and formed therewith, present a smooth surface for the collars upon the shaft, so that noise and unequal wear are avoided.

Figure 1:
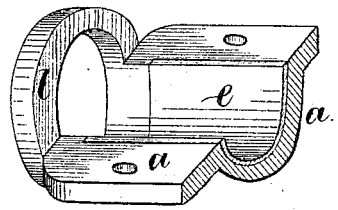
Figure 2:
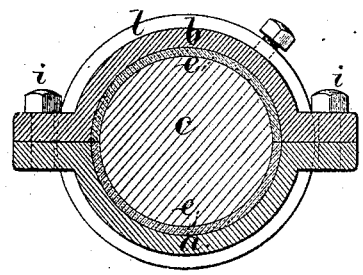
Figure 3:
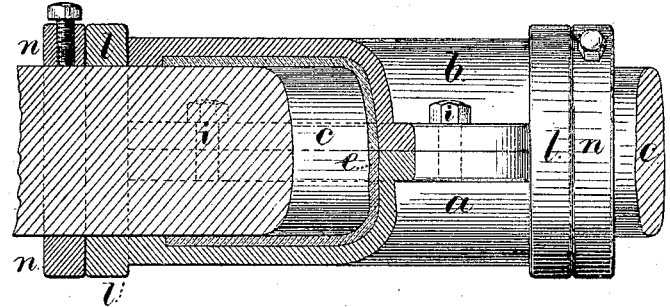

In the drawing, Fig. 1 is a perspective view of one end of one of the boxes. Fig. 2 is a cross-section, and Fig. 3 is an elevation, partially in section, of the shaft and bearing.

The two parts or boxes $a$ and $b$ are of suitable size for the shaft $c$, and usually they will be cast hollow and receive babbitt-metal, or other lining, as at $e$, and the boxes are supported in any desired character of hanger or standard. The boxes $a$ $b$ are held together by the bolts $i$; but instead of the joint between the boxes extending the entire length, the box $b$ is the shortest, so as to set between the ring-formed extensions $l$ $l$ at the ends of the box $a$, and these rings $l$ form bearings for the collars $n$ $n$, that are secured to the shaft $c$ by screws, as usual.

In putting up the line of shafting, the box $a$ has to be slipped upon the same, the shaft passing freely through the rings $l$, and these rings support the box $a$, when the bearings are being fitted, and also during repairs, if required.

I claim as my invention—

The bearing for shafts made with the ring-shaped end portions $l$ upon the box $a$, between which the box $b$ is secured, in the manner and for the purposes set forth.

Signed by me this 10th day of November, A. D. 1873.

PIERRE J. HARDY.

Witnesses:
GEO. T. PINCKNEY,
CHAS. H. SMITH.